(12) United States Patent
Takeuchi

(10) Patent No.: US 6,208,619 B1
(45) Date of Patent: Mar. 27, 2001

(54) PACKET DATA FLOW CONTROL METHOD AND DEVICE

(75) Inventor: Hirokazu Takeuchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/047,940

(22) Filed: Mar. 26, 1998

(30) Foreign Application Priority Data

Mar. 27, 1997 (JP) .................................................. 9-075768

(51) Int. Cl.[7] .............................. H04L 1/00; H04L 12/28; H04J 3/22; G06F 15/173
(52) U.S. Cl. ........................ 370/229; 370/395; 370/468; 709/235
(58) Field of Search ..................................... 370/230, 231, 370/235, 236, 237, 229, 389, 395, 398, 447, 468, 492; 709/232, 233, 234, 235

(56) References Cited

U.S. PATENT DOCUMENTS

| | | | |
|---|---|---|---|
| 4,616,359 | * 10/1986 | Fontenot ................................ | 370/60 |
| 5,935,213 | * 8/1999 | Renanand et al. ................... | 709/234 |
| 5,936,939 | * 8/1999 | Des Jardins et al. ............... | 370/229 |
| 5,995,486 | * 8/1999 | Iliadis .................................... | 370/229 |
| 6,002,667 | * 12/1999 | Manning et al. ..................... | 370/232 |

* cited by examiner

*Primary Examiner*—Alpus H. Hsu
*Assistant Examiner*—Duc Ho
(74) *Attorney, Agent, or Firm*—Finnegan, Henderson, Farabow, Garrett & Dunner

(57) ABSTRACT

In packet data flow control wherein point-to-multipoint communication or point-to-point communication is performed in a network comprising one or a plurality of packet exchanges that respectively accommodate a plurality of communication terminals, reduction of the transmission bandwidth or lowering of transmission rate caused by local congestion is absorbed by providing buffers for absorbing difference between the transmission bandwidths of the upstream link and downstream links of these packet exchanges at each packet exchange. At the packet exchanges the transmission rate of the downstream links from the packet exchange is controlled in accordance with a first load data that is notified thereto from the downstream links and, if the difference of transmission bandwidth of the upstream link and downstream links cannot be absorbed by the buffer, a second load data is generated based on the first load data and the free capacity of the buffer and the upstream link of the packet exchange is notified of the second load data.

20 Claims, 8 Drawing Sheets

| VPI/VCI | PORT STATUS | DOWNSTREAM TRANSMISSION RATE |
|---|---|---|
| 1 | 1 | 4.2 |
| | - | - |
| | 0 | 6.3 |
| | 1 | 5.4 |
| 2 | 1 | 1.5 |
| | - | - |
| | - | - |
| | 0 | 2.1 |
| ... | ... | ... |
| | ... | ... |
| | ... | ... |

FIG. 3

PACKET DATA FLOW CONTROL METHOD AND DEVICE

BACKGROUND OF THE INVENTION

1. Field of the Invention

The present invention relates to a packet data flow control method and device for a network comprising one or a plurality of packet exchanges that respectively accommodate a plurality of communication terminals in which point-to-multipoint communication or point-to-point communication is performed, and more specifically relates to a packet data flow control method and device whereby communication can be effectively implemented by narrowing of transmission bandwidth or drops in the transmission rate caused by local congestion by means of buffers provided in the packet exchanges.

2. Description of the Related Art

With development of an "information society", networking of communications continues in progress and LANs (Local Area Networks), of which examples are Ethernets or FDDIs (Fibre Distributed Data Interfaces) are becoming commonplace. Such conventional LANs efficiently implemented simultaneous transmission or multicast transmission, which are important for CL (Connectionless) communication, by taking advantage of the feature of shared media.

On the other hand, in recent years, ATM (Asynchronous Transfer Mode) has attracted attention as a system for implementing multimedia communication, and methods are being studied of implementing the CL communication on a network constructed in ATM.

However, ATM is basically a connection type communication system in which communication is performed after negotiation with the remote party and unlike the conventional shared media type LAN it is difficult to implement multicast transmission or simultaneous transmission.

In particular, in the ABR (Available Bit Rate) service that is recently being studied by the ARM forum which is a de facto standard organisation, the packet data flow control is even more difficult. This is because in the ABR service, with the object of increasing reliability, packet data flow control is performed between a sending terminal constituting the root of point-to-multipoint connection (hereinbelow referred to as pump connection) and the receiving terminals constituting the leaves.

FIG. 7 is a diagram given in explanation of packet data flow control relating to an ABR service that is currently being studied by the ATM forum, showing an operation image in an ATM network when packet data flow control represented by ABR is performed.

FIG. 7 assumes that the connection is a point-to-point connection (hereinbelow called a p-p connection) and that the flow control is implemented in accordance with a congestion indication from a terminal where congestion has occurred. Terminals 10-1, 10-2 in this network may be considered as repeaters for connection to networks other than ATM.

In FIG. 7, a sending terminal 10-1 effects communication with a destination terminal 10-2 by setting up a p-p connection through the network connecting a plurality of ATM exchanges 20-1, 20-2, 20-3. When sending terminal 10-1 has data that it wishes to send to destination terminal 10-2, it converts the data to the form of cell (data cell) and sends the data cell to destination terminal 10-2 and also sends on the same connection a congestion notification cell 50 (see FIG. 9), to be described, at intervals of a prescribed number of cells that is determined at the time of connection set-up.

These congestion notification cells 50, just like the data cells are sent to destination terminal 10-2 via ATM exchanges 20-1, 20-2, 20-3 and are then returned by the destination terminal 10-2 so that they are finally sent back to sending terminal 10-1. That is, congestion notification cells 50 flow in a loop.

Any ATM exchange 20-1, 20-2, 20-3 or destination terminal 10-2 that is on the way to receive the congestion notification cell 50, if it is in an overloaded condition, sets the congestion indication bit (CI bit) of the incoming circulating congestion notification cell 50. And if it is in normally-loaded condition it transfers the congestion notification cell as it is without modification.

If congestion is indicated by the congestion notification bit of a received congestion notification cell 50, sending terminal 10-1 lowers the transmission rate by a prescribed amount and, if congestion is not indicated, raises the transmission rate by a prescribed amount within the bit rate range specified at the time of the connection set-up.

In the example of FIG. 7, congestion occurs at ATM exchange 20-2 and as a result the congestion notification bit is set at ATM exchange 20-2 (i.e. CI is made=1), thereby notifying sending terminal 10-1 of the congestion.

FIG. 8 shows another example of flow control typified by ABR in an ATM network. While in the network of FIG. 7, the transmission rate is controlled in accordance with a congestion indication from the terminal where congestion occurred, in the network of FIG. 8, the terminal where congestion was generated is made to explicitly indicate its allowable transmission bandwidth and the transmission rate is controlled in accordance with the explicitly indicated allowable transmission bandwidth.

In the network of FIG. 8, any ATM exchange 20-1, 20-2, 20-3 or destination terminal 10-2 that is on the way to receive the congestion notification cell 50, if it is in normally loaded condition, transfers the congestion notification cell 50 as it is without modification and, if it is in overloaded condition, records explicitly the allowable transmission bandwidth that it is capable of receiving (i.e. the Explicit Rate: ER) in the incoming circulating congestion notification cell 50 before returning it to sending terminal 10-1.

Also, in the same network, as another method of explicitly indicating the allowable transmission bandwidth, it may be so arranged that any ATM exchange 20-1, 20-2, 20-3 or destination terminal 10-2 that is on the path within the network itself issues a congestion notification cell 50 as a backward explicit congestion notification cell (BECN) and sends this in the direction of the sending terminal.

If an allowable transmission bandwidth is indicated by a received congestion notification cell 50, sending terminal 10-1 lowers the transmission rate to this explicitly indicated transmission rate and, if congestion is not indicated, raises the transmission rate by a prescribed amount within the range of the peak transmission rate specified at the time of connection set-up In the example of FIG. 8, congestion occurs at ATM exchange 20-2 as a result of which the congestion indicating bit is set by ATM exchange 20-2 (CI=1) and the allowable transmission bandwidth is set to (ER=xx) and sending terminal 10-1 is thereby notified of congestion. It should be noted that, in the example shown in this Figure, if a backward explicit congestion notification cell as mentioned above is employed, a flag to indicate that the cell in question is such a cell is set (BECN=1) so as to make it possible to identify these cells.

FIG. 9 shows the format of the congestion notification cell 50 used in the congestion control discussed above. Congestion notification cell 50 comprises at least ATM cell header 501, protocol ID field 502, DIR field 503 that indicates the direction of flow of the cell (towards the destination terminal or towards the sending terminal), BN field 504 that indicates whether the cell is a backward explicit congestion notification cell or not, CI field 505 that gives the congestion indication, ER field 507 for explicitly indicating allowable bandwidth, and CCR field 508 for indicating the current transmission rate. The Res. fields 506, 509 provided in addition to these in the above format serve as reserves. However, a value is not necessarily set in the ER field 507 but this is employed if a terminal 10 or ATM 20 where congestion has occurred wishes to suddenly lower the transmission rate.

In the ATM cell header 504 is entered a VCI (Virtual Channel Identifier) value or PTI (Payload Type Indication) value indicating that the cell is a resource management cell (RM cell) for OAM (Operation Administration and Management) such as congestion notification. Protocol ID field 502 indicates that the cell in question is a congestion notification cell in the RM cell.

However, in the conventional p-p connection described above, there are the following problems.

Specifically, in the case where sending terminal 10-1 can only send data sequentially, if the transmission rate of the data that is to be sent first i.e. of the data at the front of the sending buffer, not shown, of sending terminal 10-1 is reduced due to congestion of the connection, data behind this sending buffer which is in a different connection will also be delayed. That is, transmission delays due to congestion of some connections will affect the transmission delays of all the data of sending terminal 10-1.

The above was an example of packet data flow control of an ABR connection in a p-p connection. In this example, it is sufficient to take notice of a single destination terminal from the sending terminal. However, in the packet data flow control of ABR connections in a p-mp connection, this becomes complicated due to communication being performed with the sending terminal being aware of a plurality of destination terminals.

FIG. 10 shows an example of conventional packet data flow control of ABR connections in a p-mp connection.

In FIG. 10, packet data is sent from sending terminal 10-1 to a plurality of destination terminals 10-2, 10-3, 10-4 and 10-5. The ATM exchanges 20-1, 20-2, 20-3, 20-4, 20-5, 206 and the destination terminals 10-2, 10-3, 10-4, 10-5 overwrite their traffic information such as allowable transmission bandwidths into congestion notification cells 50 that are periodically sent by sending terminal 10-1 and these congestion notification cells 50 are returned upstream at destination terminals 10-2, 10-3, 10-4, 10-5. With the above described procedure, packet data flow control of an ABR connection in a p-mp connection is achieved. The circulation path of congestion notification cells 50 is called the flow control loop.

In this flow control loop, the ATM exchanges 20-2, 20-3 located at the branch points of the connection, copy the congestion notification cells 50 from upstream (from sending terminal 10-1) and transmit them to downstream. Also, the ATM exchanges 20-2, 20-3 pick up the cells having the worst value as regards allowable transmission bandwidth from the incoming congestion notification cells 50 collected from downstream, and this worst value is returned upstream.

At this point, as shown in example in this Figure, it is assumed that congestion occurs at destination terminal 10-4.

Under these circumstances, of the congestion notification cells 50 received from downstream by ATM exchange 20-3, the allowable transmission bandwidth of congestion notification cells 50 from destination terminal 10-4 shows the worst value. Therefore, ATM exchange 20-3 sends this value upstream.

Sending terminal 10-1 that constitutes the root of the p-mp connection learns the congestion condition from these congestion notification cells 50 and reduces the bandwidth of subsequent transmission so that the congestion condition of destination terminal 10-4 is relieved.

In this case, the transmission bandwidth reduction that is performed by sending terminal 10-1 extends to all of terminals 10-2, 10-3, 10-5 apart from terminal 10-4. However, since the congestion notification cells 50 at these terminals 10-2, 10-3, 10-5 do not show the worst value, these terminals have at this time-point some degree of margin regarding the allowable transmission bandwidth. Therefore, transmission bandwidth reduction is not necessary for these terminals.

In the conventional packed data control, due to the reduction of bandwidth at the sending terminal, in spite of the fact that the transmission bandwidths of all the destination terminals or links other than the destination terminal or link that is in a congested condition are in normal condition, they are unnecessarily reduced. As a result, the other terminals, which still have some degree of margin, are subjected to reduction on usable bandwidth so that efficiency in use of the communication channels was lowered.

As discussed above, the conventional packet data flow control of a p-mp connection was so arranged that the congestion notification cells were circulated in loop fashion between the sending terminal and destination terminals, and the exchanges provided in the circulation route notified the worst value of the congestion indications or allowable transmission bandwidths notified from all the downstream destination terminals to the upstream side. Therefore, in the case where some terminals were still not congested and still had some margin in regard to allowable transmission bandwidth, there was the drawback that, as a result of the reduction on allowable transmission bandwidth that was reported by the terminal whose allowable transmission bandwidth margin was least being imposed, even the other terminals that had some degree of margin were subjected to reduction in regard to usable bandwidth, so the efficiency of use of the communication channels fell considerably.

SUMMARY OF THE INVENTION

An object of the present invention is therefore to provide a packet data flow control method and device whereby efficient communication can be achieved by absorbing drops in transmission rate or reductions on transmission bandwidth caused by local congestion by means of a buffer provided at each packet exchange.

In order to achieve this object, according to the present invention, a packet data flow control method in performing point-to-multipoint communication or point-to-point communication in a network comprising one or a plurality of packet exchanges accommodating respectively a plurality of communication terminals, comprising the steps of providing at the packet exchanges buffering means for absorbing difference of transmission bandwidth between the upstream link and downstream link of the packet exchange; controlling transmission rate to a downstream link from the packet exchanges in accordance with a first load data that is notified from the downstream link; and generating a second load data based on the first load data and free capacity of the buffering means, and notifying the second load data to upstream links of the packet exchanges.

The buffering means are provided at least packet exchanges arranged at branch points of the point-to-multipoint communication.

The first load data indicates existence of congestion of data on the downstream link and wherein the second load data notifies the upstream link of the congestion of data if the congestion of data on the downstream link cannot be absorbed by the buffering means.

Also the first load data indicates existence of congestion of data on the downstream link and an allowable bandwidth whereby the congestion can be avoided and wherein the second load data indicates maximum allowable bandwidth whereby the congestion can be avoided if congestion of data on the downstream link cannot be absorbed by the buffering means.

Also, the first load data and the second load data are notified by using congestion notification packets that are transferred between the packet exchanges.

Further, according to the present invention, a packet data flow control device for performing point-to-multipoint communication or point-to-point communication in a network comprising one or a plurality of packet exchanges accommodating respectively a plurality of communication terminals, comprises switch means for switching packets received from an upstream link to a downstream link; buffering means provided at each output port of the switch means, for temporarily storing packets that are switched to the downstream link; calculation means for calculating free capacity of the buffering means; transmission rate control means for controlling transmission rate of packets sent from the packet exchange to the downstream link in accordance with the first load data that is notified from the downstream link; and notification means for generating a second load data based on the first load data and the free capacity of the buffering means calculated by the calculation means, and notifying the upstream link of the packet exchange of the second load data.

The notification means notifies the second load data by using congestion notification packets that are transferred between the packet exchanges.

The network is an ATM network and the terminals are ATM communication terminals or network repeaters having the function of repeating between the ATM network and another network.

The packet data flow control device according to claim 10 further comprises congestion notification packet receiving means for receiving the congestion notification packets; discriminating means for discriminating whether a congestion notification packet that is received by the congestion notification packet receiving means is from an upstream link or from a downstream link; first control means for controlling transmission bandwidth in respect of the downstream link; a transmission rate management table for storing and managing transmission bandwidth in respect of the downstream link under the control of the first control means; second control means, if the congestion notification packet received by the discriminating means is identified as being from a downstream link, for reducing the transmission bandwidth in respect of the downstream link by the control means and writing the reduced transmission bandwidth in the transmission rate management table if the received congestion notification packet is a congestion indication, and for updating the transmission bandwidth by expanding or maintaining the transmission bandwidth in respect of the downstream link by the control means and writing the updated transmission bandwidth in the transmission rate management table if the received congestion notification packet is not a congestion indication; and third control means, if the congestion notification packet received by the discriminating means is identified as being from an upstream link, for returning the received congestion notification packet to the upstream link without making an indication of congestion if the bandwidth difference of the upstream link and the downstream link can be absorbed by the buffering means provided at the port, and for returning the received congestion notification packet to the upstream link with congestion indicated if the bandwidth difference of the upstream link and the downstream link cannot be absorbed by the buffering means provided at the port.

The third control means calculates the maximum allowable bandwidth that can be absorbed by the buffering means up to the next cycle and returns the received congestion notification packet to the upstream link with the maximum allowable bandwidth obtained by the calculation being indicated if the bandwidth difference of the upstream link and the downstream link cannot be absorbed by the buffering means provided at the port.

Further, according to the present invention, a packet data flow control system in a packet exchanging network in which a plurality of terminals are connected to a network comprising one or a plurality of packet exchanges wherein simultaneous transmission of data packets is performed by setting up a point-to-multipoint connection in which an arbitrary one of the terminals is a transmission source and a plurality of other terminals are respective destination terminals, the transmission source terminal comprising means for sending a congestion notification packet for exchanging load data with the downstream side relating to the direction of communication of the data packets, the destination terminals each comprising first loading condition detecting means for detecting the loading condition of their own terminal; and means for overwriting, returning and sending the detection result of the first loading condition detecting means in the congestion notification packet received from the upstream side relating to the communication direction of the data packets, a first packet exchange that is located at a branch point of the point-to-multipoint connection, comprising means for sending to the downstream side the congestion notification packet relating to the direction of communication of the data packets; load data determining means that receive the congestion notification packet that is returned from the downstream side and determine the load data in accordance with a prescribed formula; and means for overwriting the congestion notification packet by the result of the determination by the load data determining means and returning to the transmission source terminal when the congestion notification packet is received from the upstream side, and a second packet exchange that is located on the point-to-multipoint connection and which is not at a the branch point, comprising a second loading condition detecting means for detecting the loading condition of their own device; and means for receiving the congestion notification packet that is returned from the downstream side and for overwriting the congestion notification packet in accordance with the detection result of the second loading condition detecting means and sending it to the upstream side.

The load data indicates whether or not the terminal in question has fallen into a congested condition or is information indicating the value of the allowable transmission bandwidth of the terminal in question.

The first packet exchange comprises means for recording the result of determination by the load data determining means in the congestion notification packet and the second packet exchange comprises means for recording the result of detection by the second loading condition detecting means in the congestion notification packet.

The first packet exchange comprises copying means for copying data packets received from the upstream side to the number of the branch outputs, buffering means for storing the output of the copying means, and free capacity calculating means for calculating free capacity of the buffering means.

The load data determining means make a determination to the effect that their own terminal is in a congested condition only when the load data indicates at least a congested condition and it is concluded, from the calculation result obtained by the free capacity calculating means, that number of packets stored in the buffering means will exceed a predetermined number if the data packet output continues at the current transmission rate.

The load data determining means determines the maximum transmission bandwidth that can be output without discarding the data packets only when the load data explicitly indicates at least the allowable transmission bandwidth and it is concluded, from the calculation result obtained by the means for calculating free capacity, that number of packets stored in the buffering means will exceed a predetermined number if the data packet output continues at the current transmission rate.

BRIEF DESCRIPTION OF THE DRAWINGS

FIG. 3 is a view showing an example of a transmission rate management table stored in the memory in FIG. 2;

DESCRIPTION OF THE PREFERRED EMBODIMENTS

An embodiment of the present invention is described in detail below with reference to the appended drawings.

Figure 1:
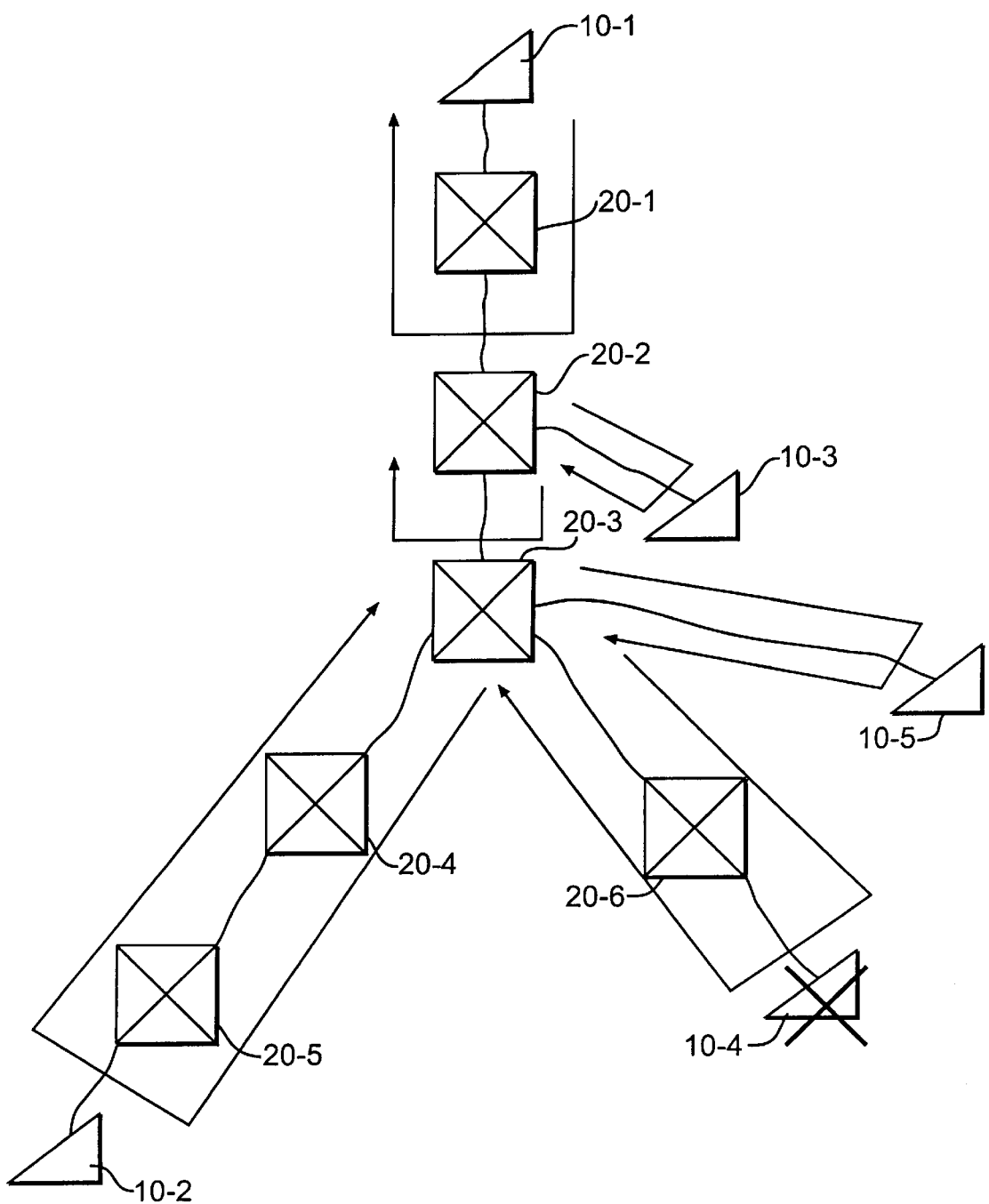
FIG. 1 is a schematic diagram showing operations of packet data flow control in an ATM network constituted by adopting a packet data flow control method and device according to the present invention.

FIG. 1 schematically shows operations of packet data flow control in an ATM network under a p-mp connection environment constituted by adopting a packet data flow control method and device according to the present invention.

The packet data flow control is a flow control typified by the ABR services in which the connection is a p-mp connection. Terminals 10-1, 10-2, 10-3, 10-4 and 10-5 in the network may be considered as repeaters for connection to networks other than ATM network.

In this ATM network, sending terminal 10-1 effects communication by setting up a p-mp connection with destination terminals 10-2, 10-3, 10-4 and 10-5 through a network in which a plurality of ATM exchanges 20-1, 20-2, 203, 20-4, 20-5 and 20-6 are connected.

However, in the network, the flow control loop that has been described above with reference to FIGS. 7 and 8 is segmented at each branch point of the connection.

Figure 9:
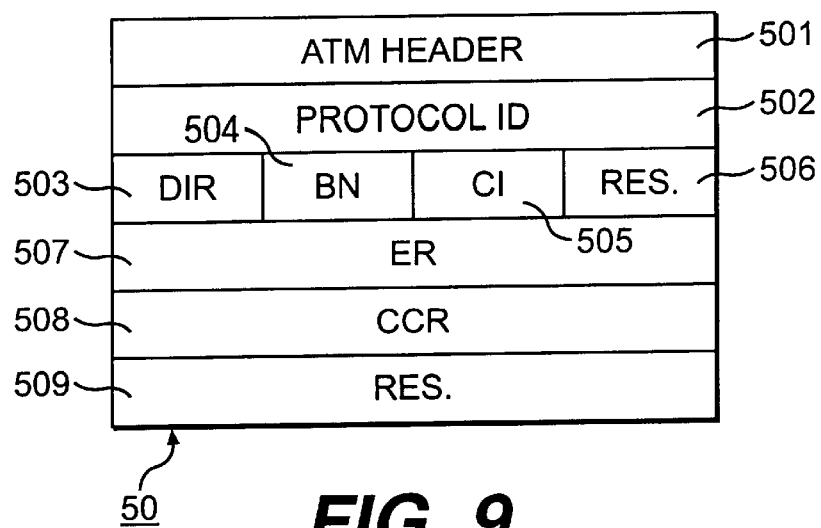
FIG. 9 shows an example of the format of a congestion notification cell used in flow control.
Figure 10:
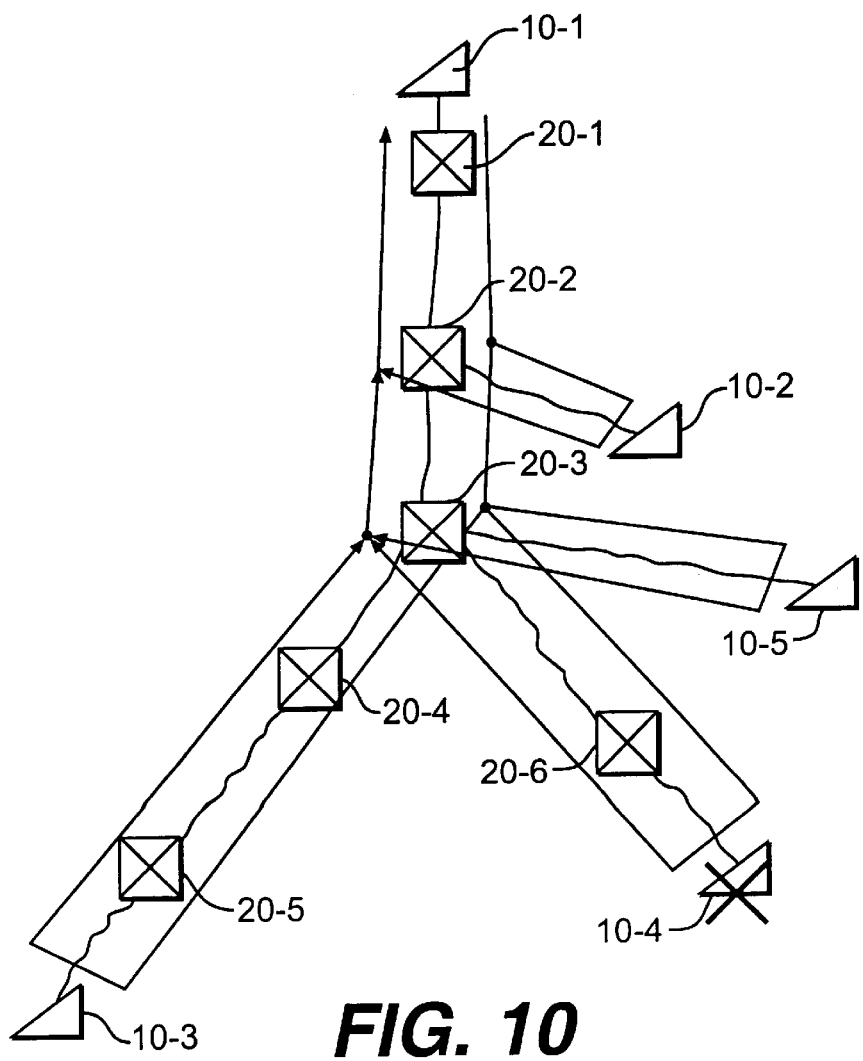
FIG. 10 is a schematic diagram showing operations of packet data in an ATM network in a conventional p-mp connection environment.

When sending terminal 10-1 has data that it wishes to send, it converts the data to cell form and sends the cell to destination terminals 10-2, 10-3, 10-4 and 10-5. At the same time, sending terminal 10-1 sends onto this connection a congestion notification cells 50 (see FIG. 9) at intervals of a prescribed number of cells determined at the time of connection set-up. These congestion notification cells 50 are sent to all the ATM exchanges 20-1, 20-2, 20-3, 20-4, 20-5, and 20-6 in the network in the same way as the data cells.

In the same way as in the flow control under the p-p connection environment (see FIGS. 7 and 8), sending terminal 10-1 lowers the transmission rate by a prescribed amount if congestion is indicated by the congestion indication bit of the received congestion notification cells 50, and raises the transmission rate by a prescribed amount within the range of the peak transmission rate specified at the time of connection set-up if congestion is not indicated.

ATM exchanges 20-1, 20-4, 20-5, and 20-6 that are arranged at points other than connection branch points perform the same operation as in the flow control under the p-p connection environment.

ATM exchanges 20-2 and 20-3 that are arranged at connection branch points copy the data and transfer the copied data to the branching connections. In accordance with division of the flow control loop at these branch points,these ATM exchanges 20-2 and 20-3 perform their operations as if they were destination terminals in the flow control under a p-p connection environment toward the upstream loops of the data flow and perform as if they were sending terminals towards the downstream loops.

Figure 2:
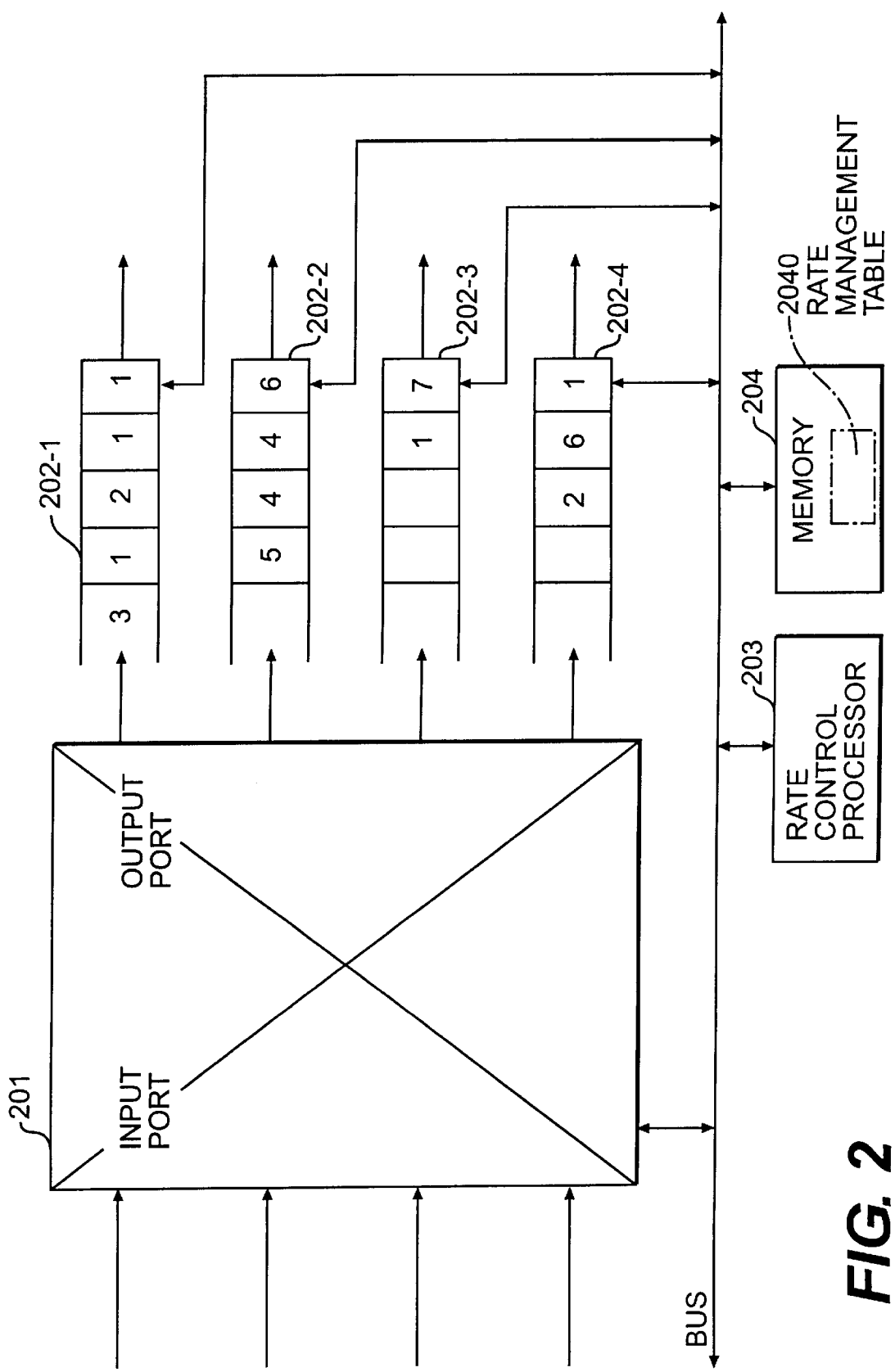
FIG. 2 is a block diagram showing the main elements of the ATM exchange shown in FIG. 1.

Concerning the interworking of an upstream loop and a downstream loop, ATM exchanges 20-2 and 20-3 notify the upstream loop of the maximum transmission bandwidth or congestion conditions with which communicate can be made without congestion of their own exchanges, based on the contents of a transmission rate management table 2040 (see FIG. 3) which stores condition information notified from the downstream loops and free capacity of buffers 202-1, 202-2, 202-3, 202-4 provided at each output port of switches 201 (which will be described later with reference to FIG. 2).

The maximum transmission bandwidth taking into account free buffer capacity changes depending on the information notified from the downstream loop, and when this happens, ATM exchanges 20-2 and 20-3 set up condition information for notification to upstream in accordance with these changes of maximum transmission bandwidth.

In ATM exchanges 20-2 and 20-3 located at connection branch points, buffers 202 absorb differences between the upstream transmission bandwidth and the downstream transmission bandwidth during the period of sending congestion notification cells 50, thereby not to notify the occurrence of congestion to the upstream side. In this way, unnecessary reduction of upstream transmission bandwidth is avoided.

Destination terminals 10-2, 10-3, 10-4, 10-5 write their own congestion condition or allowable transmission bandwidths to the congestion notification cells 50 that they receive and return these to upstream. In the network shown in FIG. 1, congestion occurs at destination terminal 10-4, as a result of which the transmission bandwidth between ATM exchange 20-3 and destination terminal 10-4 is reduced. However, if the bandwidth difference is within the range that can be absorbed by buffer 202 of ATM exchange 20-3, a notification to the effect that congestion has occurred is not sent from the ATM exchange 20-3 to the loop on the side of ATM exchange 20-2 (upstream loop).

In the above-described configuration, congestion notification cell 50 which states load information is sent by a virtual sending terminal and is returned by a virtual destination terminal with respect to the flow control loop which is made into a segment for each branch point. Alternatively, different configuration may be adopted in which congestion notification cell 50 is generated at an appropriate interval by each of the destination terminals 10-2 through 10-5 or ATM exchanges 20-1 through 20-6, and is notified to the upstream link, or such congestion notification cell may be notified only when congestion occurs.

FIG. 2 is a block diagram showing the configuration of ATM exchange 20 relating to the packet data flow control. As shown in FIG. 2, ATM exchange 20 comprises switch 201, buffers 202-1, 202-2, 202-3, 202-4, transmission rate control processor 203 and memory 204, and performs transmission rate control in accordance with routing based on the VPI/VCI (Virtual Channel Identifier) of the cell headers and congestion notification cells 50.

Switch 201 switches cells that are input from the input port to the corresponding output port determined on signalling in accordance with the VPI/VCI value.

Buffers 202-1, 202-2, 202-3 and 202-4 are provided for performing transmission rate control by ATM exchange 20. Cells switched by switch 201 are respectively stored in buffers 202-1, 202-2, 202-3 and 202-4 and are output with a transmission rate determined at the time of signalling by transmission rate control processor 203.

The respective figures entered in buffers 202-1, 202-2, 202-3 and 202-4 in FIG. 2 express the VPI/VCI values of the stored data. For example, in buffer 202-1, the VPI/VCI values are stored in the order 1, 1, 2, 1, 3, but the cells are not always sent in accordance with this order. If the VPI/VCI values are different and the transmission rates are also different, transmission rate control processor 203 performs scheduling such that cells of higher transmission rate stored in the rear of buffer 202-1 are transmitted first. However, if the VPI/VCI values are the same, then transmission is carried out in sequence in this order.

Transmission rate control processor 203 records the information of received congestion notification cells 50 in transmission rate management table 2040 (see FIG. 3) in units of VPI/VCI value and controls the transmission rate in accordance with the information of congestion notification cells 50 received from downstream.

In the above-described configuration of the exchange, buffers 202 are provided for each of output ports. Alternatively, it may be so constructed that a common single buffer is provided and all input ports share the single buffer.

In the ATM network, raising or lowering of the actual transmission rate is performed by ATM exchanges 20 and sending terminal 10-1 on the basis of congestion notification cells 50 from the downstream links.

Figure 4:
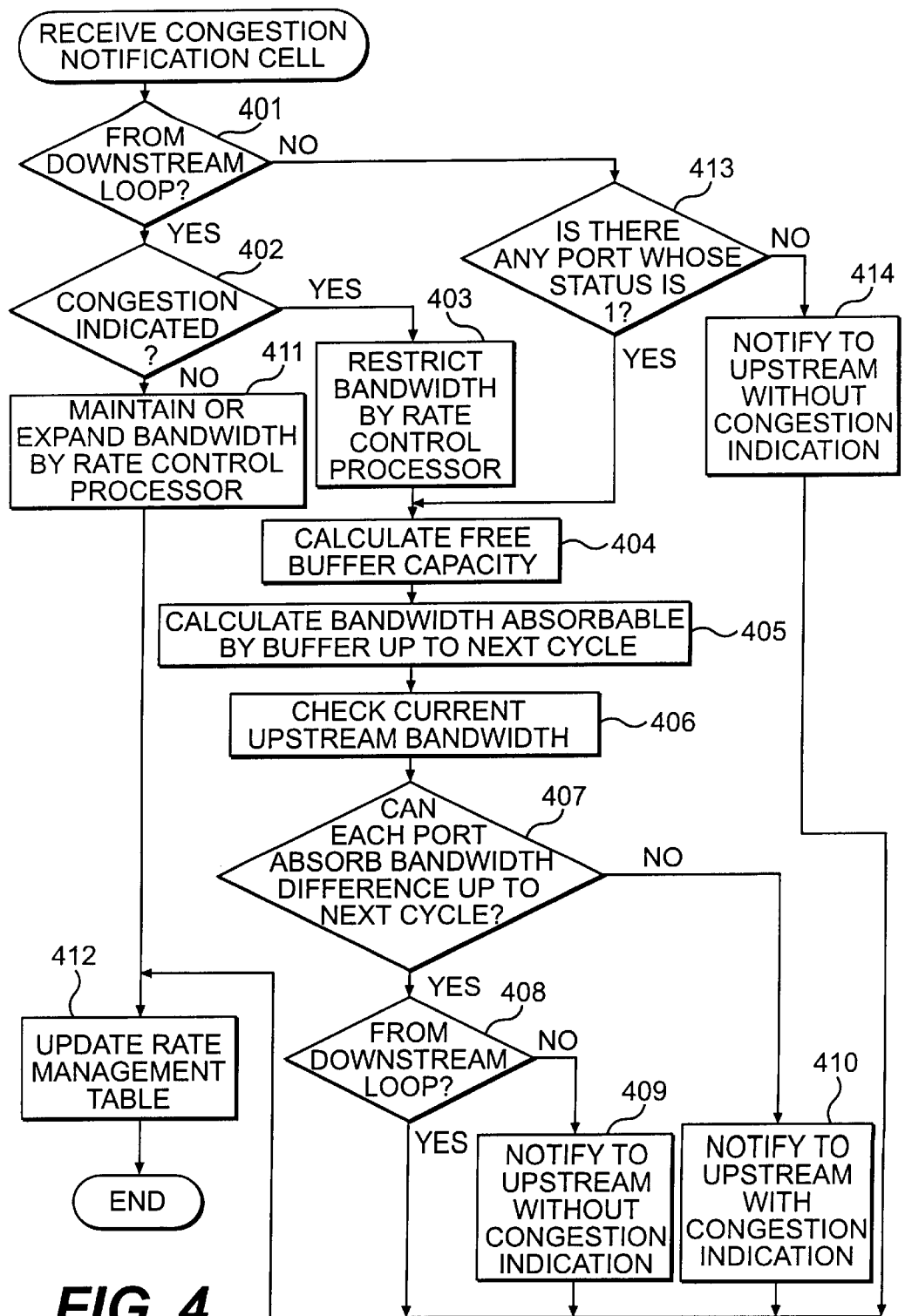
FIG. 4 is a flow chart showing an example of packet data flow control of using a congestion indication method at the ATM exchange shown in FIG. 2.
Figure 5:
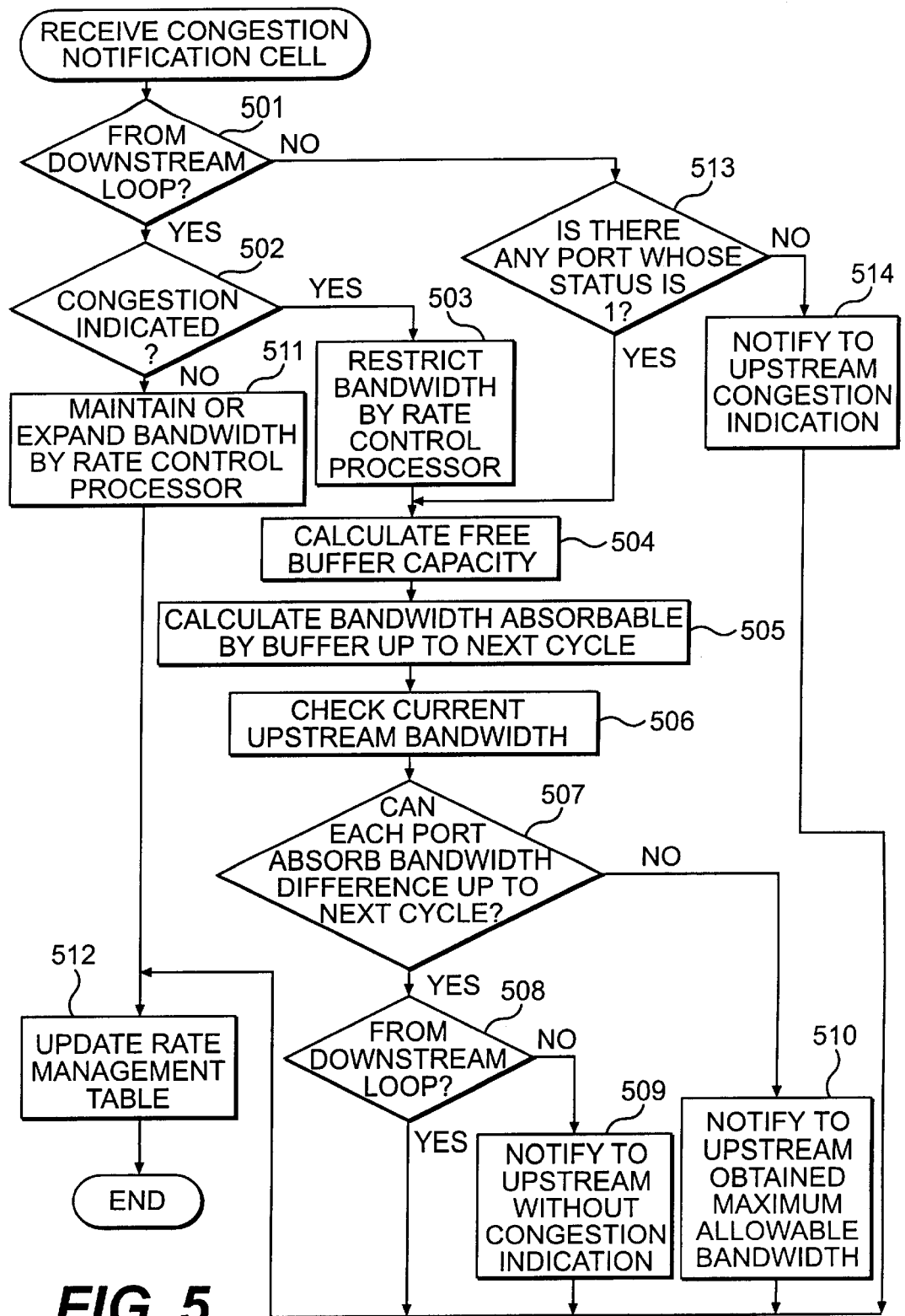
FIG. 5 is a flow chart showing an example of packet data flow control using an allowable transmission bandwidth explicit indication method at the ATM exchange shown in FIG. 2.

For this congestion notification to the upstream links, transmission rate control processor 203 of the present invention, in particular, detects free capacity of buffers 202-1, 202-2, 202-3 and 202-4 described above and notifies the upstream links of the communication condition that is finally determined in accordance with the free capacity of these buffers and the condition information notified to it from downstream (see FIG. 4 and FIG. 5).

Memory 204 stores the transmission rate management table 2040 that is used in management for purposes of flow control as described above by transmission rate control processor 203 in ATM exchange 20. An example of the format of the transmission rate management table 2040 is shown in FIG. 3.

As described above, ATM exchanges 20 manage the transmission rate management table 2040 for each VP/VC. Transmission rate control processor 203 in ATM exchange 20 determines the information that is to be notified to upstream by congestion notification cells 50 by referring to the transmission rate management table 2040.

As shown in FIG. 3, the entries of transmission rate management table 2040 comprise a VPI/VCI field Fa for identifying the VPI/VCI value of the managed p-mp connection, a port status field Fb for indicating the condition of an output port of the ATM exchange 20, and a transmission rate field Fc indicating the current transmission rate to downstream Transmission rate control processor 203 finds for these VP/Vcs the transmission bandwidth that is capable of being received by each port from the downstream transmission rate, the current upstream transmission rate and free capacity of buffer 202 depending on the congestion indication information 505 in congestion notification cells 50 or the explicitly indicated allowable transmission bandwidth 507 (see FIG. 9) from the downstream links, and, depending on whether or not congestion can be avoided, sends notification upstream by means of congestion notification cells 50 as to whether congestion is indicated or not indicated, or sends notification upstream by means of congestion notification cells 50 of the maximum transmission bandwidth at which congestion can be avoided, from the transmission bandwidths that are capable of being received at each port.

Hereinbelow the flow of processing will be described for the case in which congestion notification cells 50 are received in ATM exchanges (20-2, 20-3) serving as branch points of a p-mp connection. The description will be made for the two cases, a case where congestion indication is employed as the method of congestion notification and a case where allowable transmission bandwidth is employed as the method of congestion notification.

First of all, processing after reception of congestion notification cells 50 in the case where congestion indication is employed will be described with reference to the flow chart shown in FIG. 4. In this case, after ATM exchange 20 has received a congestion notification cell 50 (see FIG. 9), it determines (step 401) from the DIR field 503 of the cell 50 whether the cell 50 is from an upstream loop (upstream link) or is from a downstream loop (downstream link). In this case, if congestion notification cells 50 are not transmitted from the upper loop as described above, it may be so constructed that events are generated at an appropriate cycle and the following processing is performed.

In step 401, if the congestion notification cell 50 that has been received is from downstream (step 401 YES), next, a check is performed (step 402) to establish whether or not congestion is indicated from the CI field 505 of the cell 50.

Thereupon, if congestion is indicated (YES in step 402), transmission rate control processor 203 reduces the downstream transmission rate by a bandwidth amount specified at the time of signalling (step 403). Further, the transmission rate control processor 203 detects current free buffer capacities for all the ports in the connection in question (step 404), calculates upstream transmission bandwidths absorbable up to the next rate control cycle for each port (step 405), checks the current upstream transmission bandwidths form the CCR field 508 of congestion notification cell 50 (step 406), and judges whether the difference between the upstream transmission bandwidth and the downstream bandwidth obtained from the transmission rate management table 2040 is in an absorbable range for all the ports (step 407).

If the difference is in an absorbable range for all the ports (YES in step 407), congestion indication is not performed (steps 408, 409), and the result is entered in the corresponding entry of the transmission rate management table 2040 to update the table content (step 412).

If it is judged that there is a port that cannot absorb the difference (NO in step 407), congestion notification cell 50 is transmitted with congestion indication to the upstream (step 410), and contents of the transmission rate management table 2040 are updated in accordance with the upstream transmission rate (step 412).

In step 402, if congestion is not indicated (NO in step 402), transmission rate control processor 203 either maintains or increases the downstream transmission rate by a bandwidth amount specified at the time of signalling (step 411) and enters the result in the corresponding entry of transmission rate management table 2040 (step 412).

In contrast, if the congestion notification cell 50 that has been received is not from downstream, that is, if it is from the upstream link or appropriate event cycle (step 401 NO), it is checked from the transmission rate management table 2040 whether the port status of the communication connection is 1, that is, whether there is a port in which transmission rate is higher in the upstream link than in downstream link (step 413).

If there is a port whose status in the communication connection is 1 (YES in step 413), the above-described processing of step 404 through step 410 is preformed. If the congestion is absorbable by buffers 202, notification to the upstream is made without congestion indication (step 414), and if not absorbable, notification to the upstream is made with congestion indication (step 410). If necessary, contents of transmission rate management table 2040 is updated in accordance with the change in the upstream transmission rate.

In step 413, if there is no port whose status in the communication connection is 1 (NO in step 413), notification is made to the upstream without congestion indication (step 414). If necessary, contents of transmission rate management table 2040 is updated in accordance with the change in the upstream transmission rate.

Next, processing after reception of a congestion notification cell 50 when explicit indication of allowed bandwidth is employed will be described with reference to the flow chart shown in FIG. 5. In this case, ATM exchange 20, after receiving congestion notification cell 50, determines from the DIR field 503 of the cell 50 whether the cell 50 is from an upstream loop (upstream link) or is from a downstream loop (downstream link) (step 501).

The flowchart shown in FIG. 5 is same as that shown in FIG. 4 except that processing in step 410 in FIG. 4, that is, "the congestion notification cell 50 is transmitted with congestion indication to the upstream" is replaced with the step of notifying the obtained maximum allowable transmission bandwidth to the upstream (step 510).

Specifically, after ATM exchange 20 has received a congestion notification cell 50 (see FIG. 9), it determines (step 501) from the DIR field 503 of the cell 50 whether the cell 50 is from an upstream loop (upstream link) or is from a downstream loop (downstream link). In this case, if congestion notification cells 50 are not transmitted from the upper loop as described above, it may be so constructed that events are generated at an appropriate cycle and the following processing is performed.

In step 501, if the congestion notification cell 50 that has been received is from downstream (step 501 YES), next, a check is performed (step 502) to establish whether or not congestion is indicated from the CI field 505 of the cell 50.

Thereupon, if congestion is indicated (YES in step 502), transmission rate control processor 203 reduces the downstream transmission rate to the allowable transmission bandwidth explicitly indicated at the time of signalling (step 503). Further, the transmission rate control processor 203 detects current free buffer capacities for all the ports in the connection in question (step 504), calculates upstream transmission bandwidths absorbable up to the next rate control cycle for each port (step 505), checks the current upstream transmission bandwidths form the CCR field 508 of congestion notification cell 50 (step 506), and judges whether the difference between the upstream transmission bandwidth and the downstream bandwidth obtained from the transmission rate management table 2040 is in an absorbable range for all the ports (step 507).

If the difference is in an absorbable range for all the ports (YES in step 507), congestion indication is not performed (steps 508, 509), and the result is entered in the corresponding entry of the transmission rate management table 2040 to update the table content (step 512).

If it is judged that there is a port that cannot absorb the difference (NO in step 507), the obtained maximum allowable transmission bandwidth is notified to the upstream by the congestion notification cell 50 (step 510), and contents of the transmission rate management table 2040 are updated in accordance with the upstream transmission rate (step 512).

In step 502, if congestion is not indicated (NO in step 502), transmission rate control processor 203 either maintains or increases the downstream transmission rate by a bandwidth amount specified at the time of signalling (step 511) and enters the result in the corresponding entry of transmission rate management table 2040 (step 512).

In contrast, if the congestion notification cell 50 that has been received is not from downstream, that is, if it is from the upstream link or appropriate event cycle (step 501 NO), it is checked from the transmission rate management table 2040 whether the port status of the communication connection is 1, that is, whether there is a port in which transmission rate is higher in the upstream link than in downstream link (step 513).

If there is a port whose status in the communication connection is 1 (YES in step 513), the above-described processing of step 504 through step 510 is preformed. If the congestion is absorbable by buffers 202, notification to the upstream is made without congestion indication (step 514), and if not absorbable, the maximum allowable transmission bandwidth of a receivable port among all of the ports that cannot absorb the congestion is notified to the upstream (step 510). If necessary, contents of transmission rate management table 2040 is updated in accordance with the change in the upstream transmission rate.

In step 513, if there is no port whose status in the communication connection is 1 (NO in step 513), notification is made to the upstream without congestion indication (step 514). If necessary, contents of transmission rate management table 2040 is updated in accordance with the change in the upstream transmission rate.

As described above, in the present invention, regarding the method of communication of congestion indication at branch points, the flow control loop of a p-mp connection is divided at each branch (each branch point of the connection) and buffers in which data are temporarily stored are provided for each output port at exchanges constituting branch points; and notification to upstream links as to whether congestion can be avoided or not is arranged to be effected in accordance with congestion notification information that is notified thereto from downstream links and free buffer capacity.

Specifically, even if the information that is communicated from the plurality of downstream branches contains notifications to the effect that some of these are congested, this congestion condition is not directly notified to upstream so long as it is within the range in which the difference of the upstream link and the downstream links can be absorbed by the free buffer capacity, information in which congestion is not indicated is notified to the upstream link.

Also, according to the present invention, regarding the method of communication of allowable transmission bandwidth at branch points, Just as in the case of the method of communication of congestion described above, the flow control loop of a p-mp connection is divided at each branch point of the connection and the maximum data transmission bandwidth for which congestion at the branch point can be avoided is arranged to be notified to the upstream link.

Specifically, the worst value (smallest value of allowable transmission bandwidth) of the information that is communicated from a plurality of downstream branches is not directly notified to the upstream link, but rather the worst value within the range after taking into consideration absorption of the difference of the upstream link and downstream links by free buffer capacity. In other words, the maximum transmission bandwidth at which congestion can be avoided on all downstream links is notified to the upstream link.

With the method of congestion indication or allowed bandwidth explicit indication according to the present invention, even if for example one of the terminals downstream of a branch point of a p-mp connection falls into a congested condition and notifies the ATM exchange at the branch point to this effect, so long as the ATM exchange can absorb the difference of the downstream and upstream transmission bandwidths in its own buffer, it will not notify the upstream side of the congestion indication or allowable transmission bandwidth reported from the congested terminal. As a result, reduction of the overall transmission rate at the sending terminal can be moderated and transmission bandwidth can thus be more effectively utilised.

In the above description an arrangement was adopted in which buffers for absorbing difference of transmission bandwidth of the upstream link and downstream links were provided at ATM exchanges arranged at branch points of a p-mp connection, load information being notified to the upstream link responsive to information notified from the downstream links and to the free buffer capacity, so that as a result the data transmission bandwidth reduction capacity of the entire p-mp connection that is brought about by local congestion can be cut, within the range that can be absorbed by the buffers of the ATM exchanges at branch points.

Alternatively, it would also be possible to adopt an arrangement in which buffers for absorption of the difference of transmission bandwidth of the upstream link and downstream links are also provided at ATM exchanges positioned at points other than the branch points of the p-mp connection, loading information being notified to the upstream link responsive to information notified from the downstream links and to the free buffer capacity.

Also, although in the above description the case of a p-mp connection was described, a p-p connection could be arranged in the same way.

Specifically, in the case of a p-p connection, an arrangement is adopted wherein a buffer for absorbing the transmission bandwidth difference of the upstream link and downstream link is provided at an ATM exchange between the transmitting terminal and destination terminal and loading information responsive to the information that is notified from the downstream side and to the free capacity of the buffer is notified to the upstream link.

With such an arrangement, thanks to the buffer, communication can be performed without reduction of the transmission bandwidth of the upstream link i.e. the transmission bandwidth, so the data delay time of the sending terminal can be shortened.

Figure 6:
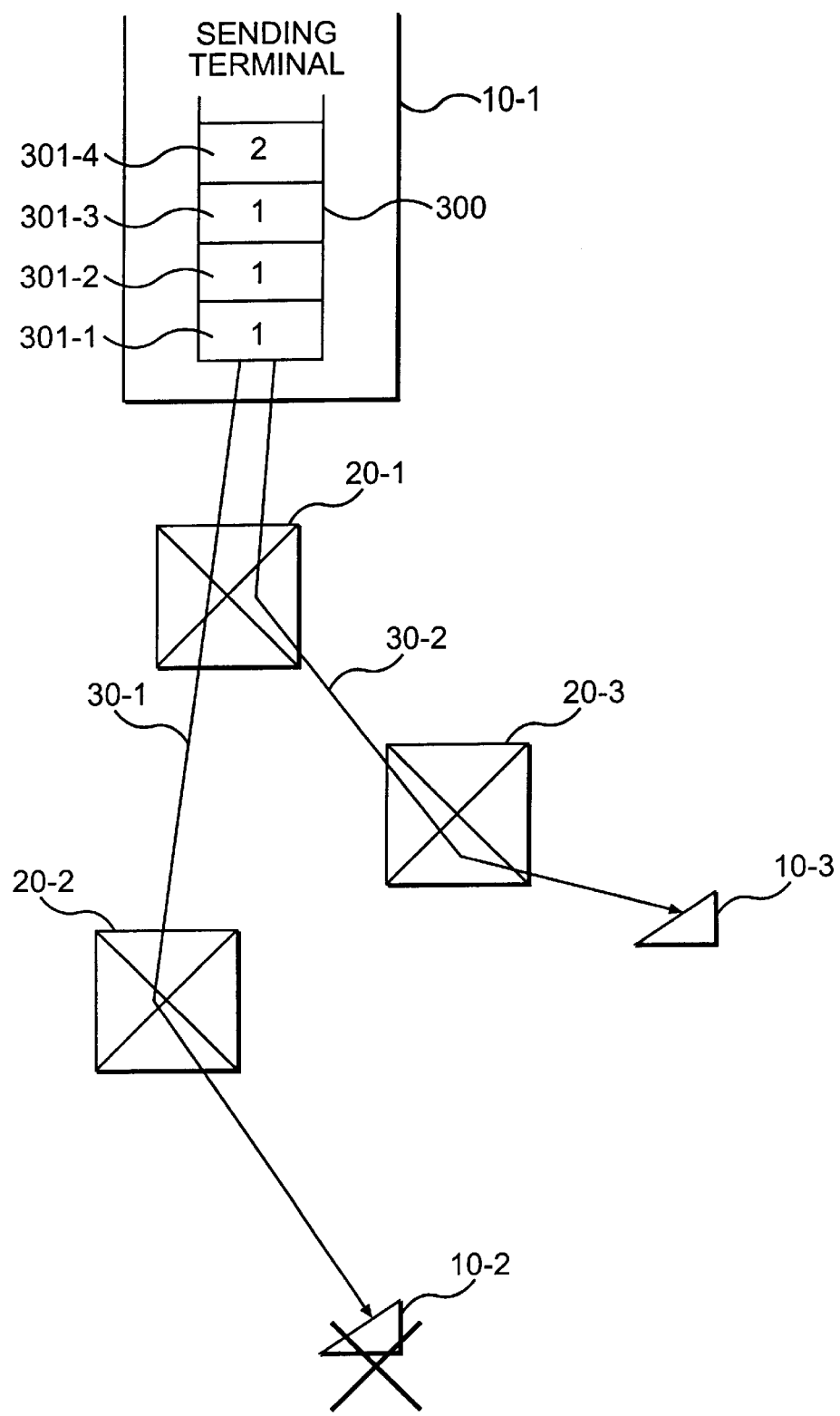
FIG. 6 is a schematic diagram showing operations of packet data control in the ATM network under a p-p connection environment

FIG. 6 is a schematic diagram showing operations of packet data control in the ATM network under a p-p connection environment.

In FIG. 6, a p-p communication is performed between a sending terminal 10-1 and a destination terminal 10-2 by way of packet exchanges 20-1 and 20-2, and a p-p communication is performed between the sending terminal 10-1 and a destination terminal 10-3 by way of the packet exchange 20-1 and a packet exchange 20-3.

The packed exchanges 20-1 through 20-3 have the same configuration as shown in FIG. 2 as in the p-mp communication. The prossing flow is also the same as that shown in FIGS. 4 and 5 except that, since the connection is not branched in the configuration of FIG. 6, only one port is required for the management at the time of access to the transmission rate management table 2040 with respect to the communication connection.

Supposing the situation that communication data 301-1, 301-2 and 301-3 with respect to the connection 30-1 and communication data 301-4 with respect to the connection 30-2 are stored in a sending buffer 300 of sending terminal 10-1, and that these communication data are transmitted from the sending terminal 10-1 in the order of the communication data 301-1, 301-2, 301-3 and 301-4.

Figure 7:
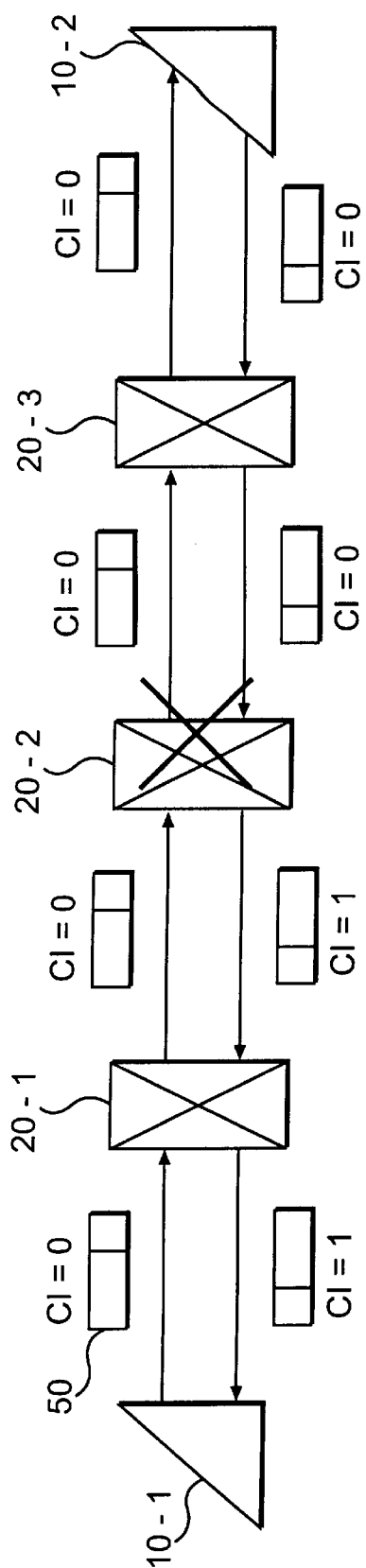
FIG. 7 is a schematic diagram showing operations of packet data flow control using a congestion indication method in an ATM network in a conventional p-p connection environment.
Figure 8:
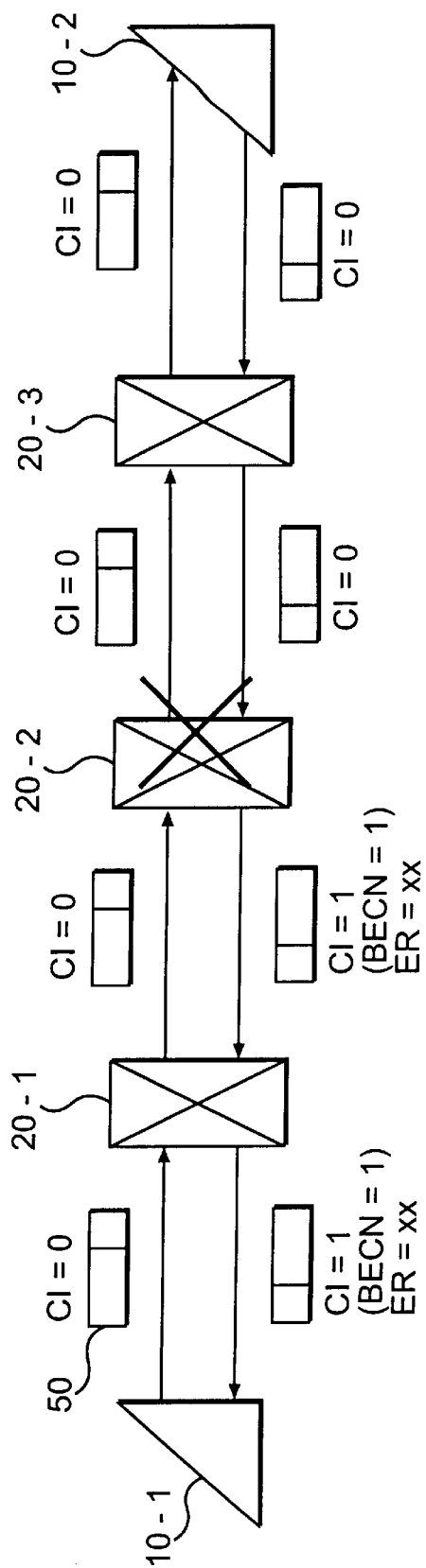
FIG. 8 is a schematic diagram showing operations of packet data flow control using an allowable transmission bandwidth explicit indication method in an ATM network in a conventional p-p connection environment.

In the conventional system as shown in FIG. 7 or FIG. 8, when destination terminal 10-2, which is a destination terminal for the connection 30-1, is in congestion and transmission rate in the connection 30-1 is reduced, data 301-4 for the connection 30-2, which is stored backward in sending buffer 300, is affected so as to increase the transmission delay of the data 301-4.

In contrast, according to the present invention, when destination terminal 10-2 is in congestion and the transmission route between destination terminal 10-2 and packet exchange 20-1 is narrowed, buffers of packet exchanges 20-1 and 20-2 store and absorb the communication data so that sending terminal 10-1 can transmit communication data without reducing its transmission rate as long as the buffers of packet exchanges 20-1 and 20-2 can store the communication data. Therefore, communication data for the connection 30-2 also can be transmitted without delay.

What is claimed is:

1. A packet data flow control method in performing point-to-multipoint communication or point-to-point communication in a network comprising one or a plurality of packet exchanges accommodating respectively a plurality of communication terminals, comprising the steps of:
   providing at the packet exchanges buffering means for absorbing difference of transmission bandwidth between an upstream link and a downstream link of the packet exchanges when congestion occurs;
   controlling transmission rate to the downstream link from the packet exchanges in accordance with a first load data that is notified from the downstream link; and
   generating a second load data based on the first load data and free capacity of the buffering means, and notifying the second load data to the upstream link of the packet exchanges.

2. The packet data flow control method according to claim 1 wherein the buffering means are provided at least packet exchanges arranged at branch points of the point-to-multipoint communication.

3. The packet data flow control method according to claim 1 wherein the first load data indicates existence of congestion of data on the downstream link and wherein the second load data notifies the upstream link of the congestion of data if the congestion of data on the downstream link cannot be absorbed by the buffering means.

4. The packet data flow control method according to claim 1 wherein the first load data indicates existence of a congestion of data on the downstream link and an allowable bandwidth whereby the congestion of data can be avoided and wherein the second load data indicates maximum allowable bandwidth whereby the congestion of data can be avoided if the congestion of data on the downstream link cannot be absorbed by the buffering means.

5. The packet data flow control method according to claim 1 wherein the first load data and the second load data are notified by using congestion notification packets that are transferred between the packet exchanges.

6. A packet data flow control device for performing point-to-multipoint communication or point-to-point communication in a network comprising one or a plurality of packet exchanges accommodating respectively a plurality of communication terminals, comprising:
   switch means for switching packets received from an upstream link to a downstream link;
   buffering means provided at each output port of the switch means, for temporarily storing the packets that are switched to the downstream link;
   calculation means when congestion occurs for calculating a free capacity of the buffering means;
   transmission rate control means for controlling transmission rate of packets to be sent to the downstream link in accordance with a first load data that is notified from the downstream link; and
   notification means for generating a second load data based on the first load data and the free capacity of the buffering means calculated by the calculation means, and notifying the upstream link of the second load data.

7. The packet data flow control device according to claim 6 wherein the buffering means are provided in packet exchanges arranged at a plurality of branch points in the point-to-multipoint communication.

8. The packet data flow control device according to claim 6 wherein the first load data indicates existence of congestion of data on the downstream link and wherein the second load data notifies the upstream link of the congestion of data if the congestion of data on the downstream link cannot be absorbed by the buffering means.

9. The packet data flow control device according to claim 6 wherein the first load data indicates existence of a congestion of data on the down stream link and an allowable bandwidth whereby the congestion of data can be avoided and wherein the second load data indicates maximum allowable bandwidth whereby the congestion of data can be avoided if the congestion of data on the downstream link cannot be absorbed by the buffering means.

10. The packet data flow control device according to claim 6 wherein the notification means notifies the second load data by using congestion notification packets that are transferred between the packet exchanges.

11. The packet data flow control device according to claim 10 further comprising:
    congestion notification packet receiving means for receiving at least one congestion notification packet;
    discriminating means for discriminating whether a congestion notification packet that is received by the congestion notification packet receiving means is from an upstream link or from a downstream link;
    first control means for controlling a transmission bandwidth in respect of the downstream link;
    a transmission rate management table for storing and managing the transmission bandwidth in respect of the downstream link under the control of the first control means;
    second control means, if the congestion notification packet received by the discriminating means is identified as being from the downstream link, for reducing the transmission bandwidth in respect of the downstream link and writing the reduced transmission bandwidth in the transmission rate management table if the received congestion notification packet is a congestion indication, and for updating the transmission bandwidth by expanding or maintaining the transmission bandwidth in respect of the downstream link and writing the updated transmission bandwidth in the transmission rate management table if the congestion notification packet received by the discriminating means is not the congestion indication; and
    third control means, if the congestion notification packet received by the discriminating means is identified as being from an upstream link, for returning the received congestion notification packet to the upstream link without making an indication of congestion if a bandwidth difference of the upstream link and the downstream link can be absorbed by the buffering means provided at the output port, and for returning the received congestion notification packet to the upstream link with congestion indicated if the bandwidth difference of the upstream link and the downstream link cannot be absorbed by the buffering means provided at the output port.

12. The packet data flow control device according to claim 11 wherein the third control means calculates a maximum allowable bandwidth that can be absorbed by the buffering means and returns the received congestion notification packet to the upstream link with the maximum allowable bandwidth calculated by the third control means being indicated if the bandwidth difference of the upstream link and the downstream link cannot be absorbed by the buffering means provided at the output port.

13. The packet data flow control device according to claim 6 wherein the network is an ATM network and the terminals are ATM communication terminals or network repeaters having a function of repeating between the ATM network and another network.

14. A packet data flow control system in a packet exchanging network in which a plurality of terminals are connected to a network comprising one or a plurality of packet exchanges wherein simultaneous transmission of data packets is performed by setting up a point-to-multipoint connection in which an arbitrary one of the terminals is a transmission source terminal and a plurality of other terminals are respective destination terminals, the transmission source terminal comprising means for sending a congestion notification packet for exchanging load data with a downstream side relating to a direction of communication of the data packets, the destination terminals each comprising:
first loading condition detecting means for detecting a loading condition of their own terminal; and
means for overwriting, returning and sending the detection result of the first loading condition detecting means in the congestion notification packet received from an upstream side relating to the communication direction of the data packets, a first packet exchange that is located at a branch point of the point-to-multipoint connection, comprising:
means for sending to the downstream side the congestion notification packet relating to the direction of communication of the data packets;
load data determining means that receives the congestion notification packet that is returned from the downstream side and determines load data in accordance with the congestion notification packet; and
means for overwriting the congestion notification packet by a result of the determination by the load data determining means and returning to the transmission source terminal when the congestion notification packet is received from the upstream side, and a second packet exchange that is located on the point-to-multipoint connection and which is not at a branch point, comprising:
a second loading condition detecting means for detecting a loading condition of their own device; and
means for receiving the congestion notification packet that is returned from the downstream side and for overwriting the congestion notification packet in accordance with a detection result of the second loading condition detecting means and sending it to the upstream side.

15. The packet data flow control system according to claim 14 wherein the load data comprises information indicating whether or not the terminal in question has fallen into a congested condition or information indicating the value of the allowable transmission bandwidth of the terminal in question.

16. The packet data flow control system according to claim 14 wherein the first packet exchange comprises means for recording the result of determination by the load data determining means in the congestion notification packet and the second packet exchange comprises means for recording the result of detection by the second loading condition detecting means in the congestion notification packet.

17. The packet data flow control system according to claim 14 wherein the first packet exchange comprises copying means for copying data packets received from the upstream side to at least one branch output buffering means for storing an output of the copying means, and free capacity calculating means for calculating a free capacity of the buffering means.

18. The packet data flow control system according to claim 17 wherein the load data determining means makes a determination to the effect that its own terminal is in a congested condition only when the load data indicates a congested condition and the load data determining means judges from the calculation result obtained by the free capacity calculating means, that a number of packets stored in the buffering means will exceed a predetermined amount if a data packet output continues at a current transmission rate.

19. The packet data flow control system according to claim 17 wherein the load data determining means determines a maximum transmission bandwidth that can be output without discarding the data packets only when the load data explicitly indicates the allowable transmission bandwidth and the load data determining means judges from a calculation result obtained by the means for calculating free capacity, that a number of packets stored in the buffering means will exceed a predetermined amount if a data packet output continues at a current transmission rate.

20. The packet data flow control system according to claim 14 wherein the network is an ATM network and the terminals are ATM communication terminals or network repeaters having a function of repeating between the ATM network and another network.

* * * * *